United States Patent
Berger et al.

(10) Patent No.: US 9,194,759 B2
(45) Date of Patent: Nov. 24, 2015

(54) FLANGE FOR PRESSURE MEASUREMENT CELLS OR PRESSURE TRANSFER MEANS AND METHOD FOR MANUFACTURE OF SUCH FLANGES

(75) Inventors: Markus Berger, Wehr (DE); Volker Frey, Schopfheim (DE); Dietmar Salg, Schopfheim (DE); Christoph Bollig, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 190 days.

(21) Appl. No.: 13/994,208

(22) PCT Filed: Nov. 23, 2011

(86) PCT No.: PCT/EP2011/070834
§ 371 (c)(1),
(2), (4) Date: Aug. 27, 2013

(87) PCT Pub. No.: WO2012/079944
PCT Pub. Date: Jun. 21, 2012

(65) Prior Publication Data
US 2013/0333479 A1    Dec. 19, 2013

(30) Foreign Application Priority Data
Dec. 15, 2010    (DE) .......................... 10 2010 063 114

(51) Int. Cl.
*G01L 7/08*     (2006.01)
*G01L 19/06*    (2006.01)
*B23K 26/14*    (2014.01)
(Continued)

(52) U.S. Cl.
CPC ............... *G01L 7/08* (2013.01); *B23K 26/1411* (2013.01); *B23K 26/3206* (2013.01); *B23K 26/3213* (2013.01); *B23K 26/345* (2013.01); *B23K 35/004* (2013.01); *B23K 35/007* (2013.01); *B23K 35/0244* (2013.01); *G01L 9/0048* (2013.01); *G01L 19/06* (2013.01); *G01L 19/0645* (2013.01); *B23K 2201/20* (2013.01); *B23K 2201/34* (2013.01); *B23K 2203/04* (2013.01); *B23K 2203/18* (2013.01); *Y10T 29/5176* (2015.01)

(58) Field of Classification Search
None
See application file for complete search history.

(56) References Cited

U.S. PATENT DOCUMENTS 5,499,539 A * 3/1996 Glienke et al. ................. 73/756
5,620,208 A * 4/1997 Kirkham ..................... 285/21.1
(Continued)

FOREIGN PATENT DOCUMENTS

CN    1329225 A    1/2002
CN    1864001 A    11/2006
(Continued)

OTHER PUBLICATIONS

International Search Report, EPO, The Netherlands, Jun. 28, 2012.
(Continued)

*Primary Examiner* — Andre Allen
(74) *Attorney, Agent, or Firm* — Bacon & Thomas, PLLC

(57) ABSTRACT

A flange for a corrosion resistant and nevertheless low cost flange for pressure measurement cells, or pressure transfer means, is composed essentially of a metal foundation of a standard material and is protected on the side facing a process medium by a there applied layer of a highly alloyed, special material.

4 Claims, 1 Drawing Sheet

(51) Int. Cl.
- *B23K 26/32* (2014.01)
- *B23K 26/34* (2014.01)
- *B23K 35/00* (2006.01)
- *B23K 35/02* (2006.01)
- *G01L 9/00* (2006.01)

(56) References Cited

U.S. PATENT DOCUMENTS

| | | | |
|---|---|---|---|
| 6,579,628 | B2 | 6/2003 | Takeuchi |
| 6,990,810 | B2 | 1/2006 | Pellizzari |
| 7,814,798 | B2 | 10/2010 | Filippi |
| 2009/0162207 | A1 | 6/2009 | Peters |
| 2010/0064816 | A1 | 3/2010 | Filippi |

FOREIGN PATENT DOCUMENTS

| | | |
|---|---|---|
| CN | 101021008 A | 8/2007 |
| CN | 101462202 A | 6/2009 |
| CN | 101571034 A | 11/2009 |
| DE | 8713822.0 | 1/1988 |
| DE | 10108105 A1 | 10/2002 |
| EP | 0594778 B1 | 5/1994 |
| EP | 0607482 A1 | 7/1994 |
| EP | 2072176 A1 | 6/2009 |
| WO | 02077596 A1 | 10/2002 |
| WO | 2005038334 A2 | 4/2005 |

OTHER PUBLICATIONS

German Search Report, German Patent Office, Munich, Sep. 7, 2011.
English translation of IPR, WIPO, Geneva, Jun. 27, 2013.

* cited by examiner

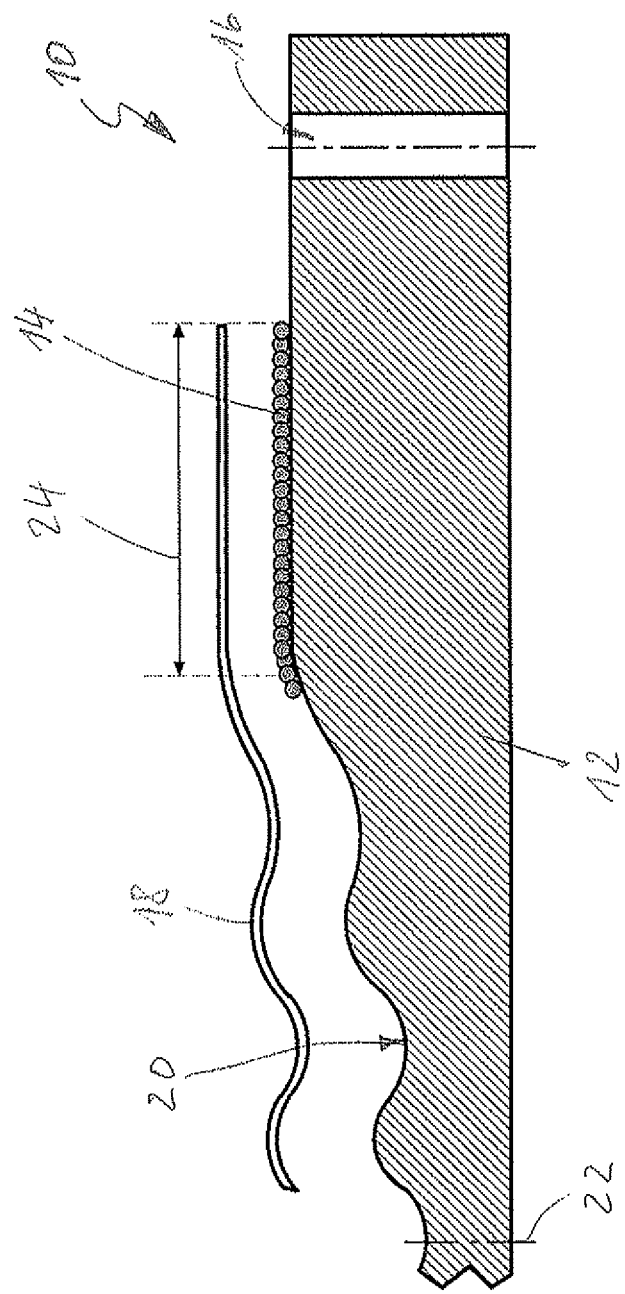

FLANGE FOR PRESSURE MEASUREMENT CELLS OR PRESSURE TRANSFER MEANS AND METHOD FOR MANUFACTURE OF SUCH FLANGES

TECHNICAL FIELD

The invention relates to a flange for pressure measurement cells and method of manufacturing the flage.

BACKGROUND DISCUSSION

Pressure measuring arrangements are well known in industrial process measurements technology. They serve in various embodiments for determining pressure of a process medium. Known pressure measuring arrangements of this type comprise a platform, which can also be a flange, and a thereon secured membrane, more specifically a measuring membrane, which is deformed in the direction of the platform by applied pressure of the process medium. A stroke of the membrane arising in such case is sensed by suitable techniques, usually electrically, and provides a measure for the applied pressure. The pressure measuring cell works thus as a pressure transducer. Flanges serving as platform of a pressure measuring cell are significantly larger than the pressure measuring cell itself.

In case the actual measuring membrane of the pressure measuring cell should not itself be exposed to the process medium to be measured, either because the process medium is chemically very aggressive or because it has a very high temperature, a pressure transfer means is used, which senses the pressure of the process medium and transmits such to the actual pressure transducer. Such pressure transfer means frequently comprise likewise a diaphragm carrier, comparable the above mentioned platform, on which also a membrane, also called an isolating diaphragm, is secured, which comes in contact with the process medium to be measured. An intermediate space between the isolating diaphragm and the diaphragm carrier is connected with a liquid filled, capillary line, so that the pressure of the process medium applied to the isolating diaphragm is transmitted to a pressure measuring cell connected with the capillary line.

It has been found in practice that materials directly in contact with the process medium, be it the material of the membrane of a pressure measuring cell or of such a pressure transfer means, must be manufactured of a special material, since it must withstand aggressive process media or frequently also aggressive cleaning methods used for pipelines and containers. The same holds, in principle, also for the side of flanges that contact the process medium. Manufacturing a total flange of a special material is, however, very costly and makes pressure measurement cells, or pressure transfer means with such flanges as platform, more expensive.

SUMMARY OF THE INVENTION

An object of the invention, therefore, is to provide a corrosion resistant and low cost flange for pressure measurement cells and pressure transfer means.

This object is achieved according to the invention by a flange for pressure measurement cells or pressure transfer means. The flange is essentially composed of a foundation of a metal standard material and is protected on the side facing a process medium by a there applied layer of a highly alloyed, special material.

In the case of a special form of embodiment of the flange of the invention, the metal standard material for the flange is a simple, carbon steel.

In the case of another form of embodiment of the flange of the invention, the applied special material is a nickel alloy, such as e.g. Hastelloy C276/2.4819.

The above object is achieved according to the invention, moreover, by a method for manufacturing a flange, wherein
a) the flange is premachined and drilled to its basic form;
b) metal powder of the predetermined special material is applied on a desired sealing region of the flange;
c) the powder is welded onto the flange by a suitable welding method;
d) the flange with the welded-on layer of special material is finish machined to a desired dimension; and
e) a membrane, or diaphragm, is welded tightly on the layer of special material.

In the case of a special form of embodiment of the method of the invention, the powder of special material is applied with spiral shape on the flange.

In the case of an additional form of embodiment of the method of the invention, the powder of special material is welded on the flange by laser deposition welding.

An advantage of the invention is that, only in the case of the flange of the invention, only its side actually exposed to possible corrosion is protected with a corrosion resistant material. Serving as foundation for the flange of the invention is a simple, carbon steel, such as, for example, St 52-3/1.0570 or a similarly easily worked and cost effective steel. The corrosion resistant material is applied in simple manner and welded with the foundation of the flange by a cost effective welding method. In this way, an intimate and tight connection of the foundation of the flange with the special material is achieved. The applied, special material can be worked in the context of the fine- and finish machining of the flange and so be brought to the desired dimensions.

A further advantage of the invention is that the special material for protecting the flange can be the same material as the later to be secured thereon membrane or diaphragm, be it an isolating diaphragm of a pressure transfer means or a measuring membrane of a pressure measuring cell.

BRIEF DESCRIPTION OF THE DRAWING

The invention will now be more exactly described and explained on the basis of the appended drawing, the sole FIGURE of which shows a cross section of a preferred form of embodiment of the invention.

DETAILED DISCUSSION IN CONJUCITON WITH THE DRAWING

A flange 10 of the invention includes: a cylindrical foundation 12 of a cost effective, metal, standard material, preferably a simple carbon steel, such as, for example, St52-3/1.0570 or an austenitic steel such as, for example, 1.4404/316L; and a thereon welded layer 14 of a metal special material, for example, Hastelloy C276/2.4819. The flange 10 can, in usual manner, be bolted to a counterflange (not shown). For purposes of illustration, the drawing shows one of the bolt holes 16 of a series of bolt holes arranged on a circle at the exterior of the flange 10.

In order to illustrate that the flange 10 of the invention is intended for a pressure measuring arrangement, be it for a pressure transfer means, or be it for a pressure measuring cell, also shown in the drawing is a membrane, or diaphragm, 18 and a membrane, or diaphragm, bed 20 formed in the foundation 12. A center line of the flange 10 is indicated with the numeral 22.

The welded on layer 14 of special material is preferably applied in a sealing region 24 of the flange 10 indicated by the double-headed arrow and is welded on, preferably by laser deposition welding. In practice, a spiral shaped application and an overlapping of plies of the powdered special material has proven worthwhile for forming layer 14.

After the welding-on of the special material, the flange with the welded on layer is finish machined to a desired dimension. Then, the membrane, or diaphragm, 18 is tightly welded to the layer 14 of special material, especially using at least two annular, concentric weld seams, which are not shown here for reasons of perspicuity. Preferably, the size of the membrane, or diaphragm, 18 is so selected that, in accordance with its purpose, it covers the diaphragm bed; the membrane, or diaphragm, 18 can, however, also be so selected that it covers the desired sealing region 24 of the flange 10. Selected as special material for protecting the flange 10 is preferably the same material, of which the later thereon to be secured membrane, or diaphragm, 18 is composed.

The invention claimed is:

1. A flange for pressure measurement cells or pressure transfer means, having a foundation of a metal standard material protected on the side facing a process medium by a there applied layer of a highly alloyed, special material wherein:
   said metal standard material is a simple, carbon steel or an ordinary, austenitic steel; and
   said applied special material is a nickel alloy.

2. A method for manufacturing a flange for pressure measurement cells or pressure transfer means, having a foundation of a metal standard material protected on the side facing a process medium by a there applied layer of a highly alloyed, special material, said applied special material being a nickel alloy, the method comprising the steps of:
   a) premachining and drilling to its basic form;
   b) applying a metal powder of the predetermined special material on a desired sealing region of the flange;
   c) welding the powder onto the flange by a suitable welding method;
   d) finish machining the flange with the welded-on layer of special material to a desired dimension; and
   e) welding a membrane, or diaphragm, tightly on the layer of the special material.

3. The method as claimed in claim 2, wherein:
   the powder of the special material is applied with spiral shape on the flange.

4. The method as claimed in claim 2, wherein:
   the powder of the special material is welded on the flange by laser deposition welding.

* * * * *